Sept. 13, 1966  C. O. WOOD  3,272,429
ROTORS OF CENTRIFUGAL FANS
Filed Oct. 16, 1964

INVENTOR:
CARL O. WOOD,
BY Robert J. Palmer
ATTORNEY

United States Patent Office 3,272,429
Patented Sept. 13, 1966

3,272,429
ROTORS OF CENTRIFUGAL FANS
Carl O. Wood, Needham Heights, Mass., assignor to Westinghouse Electric Corporation, Pittsburgh, Pa., a corporation of Pennsylvania
Filed Oct. 16, 1964, Ser. No. 404,339
3 Claims. (Cl. 230—134)

This invention relates to rotors of centrifugal fans, and relates more particularly to side plates of such rotors.

Centrifugal fan rotors having airfoil blades usually have side plates with inner portions curved in circular arcs around their diverging, axial inlet passages, for gradually turning the air entering the rotors from an axial to a radial direction. The radius of such a curved portion has been relatively large—so large in a rotor having blades with straight inlet sides, that the noses of the blades have had to have extensions welded thereto and to the side plate, to fill in spaces where the side plate curves away from the noses. If the straight portion of the side plate is extended to the noses of the blades so that there are no such spaces, the inlet passage is constricted. If the noses of the blades are moved radially outward so that their straight inlet sides contact the straight portion of the side plate, the chord lengths of the blades are too short.

This invention permits the straight inlet sides of such blades to contact along their entire lengths, the straight portion of such a side plate without constricting the inlet passage, and without decreasing the chord lengths of the blades. The curve of the curved side plate portion starts at the noses of the blades, and has a relatively small radius and a relatively small arc. Joined to the outer end of such curved side plate portion tangential thereto is the inner end of an outer, curved side plate portion having a relatively large radius and a relatively large arc. Such compound curvature results in proper turning of the air, and in a larger inlet passage than was formerly provided.

An object of this invention is to improve the inlet passages of rotors of centrifugal fans having blades with straight sides.

This invention will now be described with reference to the annexed drawings, of which:

Figure 1:
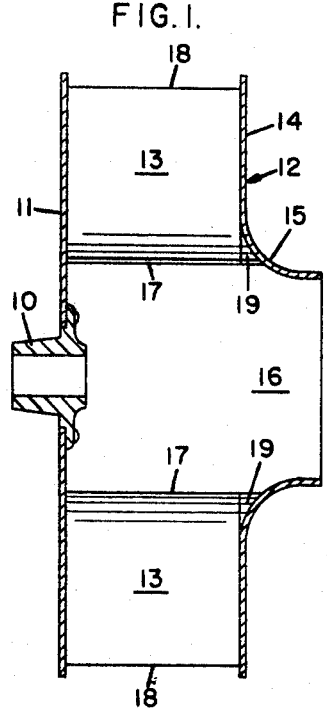
FIG. 1 is a side view, in section, of a prior art centrifugal fan rotor.

Referring first to FIG. 1, a prior art rotor has a hub 10, a back plate 11 attached to the hub, a side plate 12 spaced outwardly from the back plate, and airfoil blades 13 supported between the back and side plates. The side plate 12 has an outer, straight portion 14 extending normal to the axis of the rotor, and has an inner portion 15 curved in a circular arc around an axial inlet passage 16. The blades 13 have straight inner sides in contact with the back plate 11, and have straight outer sides in contact with the straight portion 14 of the side plate 12. The blades 13 have noses 17 and tips 18. The noses 17 extend towards the axis of the rotor past where the side plate portion 15 starts to curve, and to fill in the space between the straight side of each blade at its nose 17 and the portion of the side plate portion 15 that is curved away from the nose, a fill-in section 19 shaped to conform with the shape of the nose, is welded to the nose and side plate. Airfoil blading for such a rotor is disclosed in Catalog 1320 of the Sturtevant Division of Westinghouse Electric Corporation.

If the straight portion of the side plate 12 was extended inwardly to the noses 17, the curved side plate portion 15 would have to be moved correspondingly inwardly, and the passage 16 would be excessively constricted. If the noses 17 were moved outwardly so as to be in contact with the straight portion 14 of the side plate 12, the tips 18 of the blades 13 would extend outwardly beyond the outer ends of the side and back plates, or else the chord lengths of the blades would have to be shortened.

Figure 2:
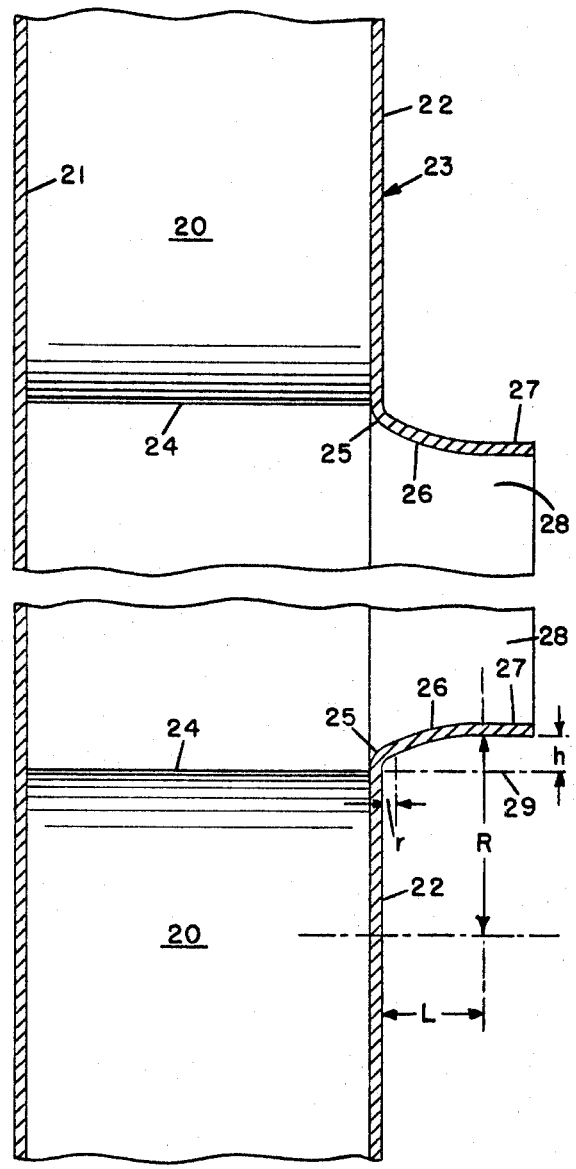
FIG. 2 is an enlarged, fragmentary view, in section, of a centrifugal fan rotor embodying this invention.

Referring now to FIG. 2, airfoil blades 20 have straight inner sides attached to back plate 21, and have straight outer sides attached to straight portion 22 of side plate 23. The blades 20 have noses 24. Beginning at the circle in which the outer ends of the noses 24 are located, the side plate 23 has an inner portion 25 curved, in section, in a relatively small arc having a relatively small radius $r$. The center of curvature of the portion 25 of the lower portion of FIG. 2 is shown on a line 29 forming a continuation of the nose 24 of the adjacent blade 20. Connecting tangentially with the outer end of the curved side plate portion 25 is the inner end of an outer side plate portion 26 curved, in section, in a relatively large arc having a relatively large radius R. The center of curvature of the side plate portion 26 is at a distance L along a line parallel to the axis of the rotor, from the straight side plate portion 22. The outer end of the side plate portion 26 preferably connects tangentially with a relatively short, straight in section, side plate portion 27 which extends parallel to the axis of the rotor. The outer end of the side plate portion 26, and the side plate portion 27, if used, is spaced a distance $h$ towards the axis of the rotor from the line 29. The outer end of the side plate portion 26 is at the distance L from the straight side plate portion 22. The side plate portion 27 may be provided to cooperate with the adjacent inner end of the casing sheet which is not shown, which forms the usual, converging, axial inlet passage of the fan casing. The joined together side plate portions 25, 26 and 27 extend around a diverging, axial inlet passage 28.

The radius $r$ should be approximately 0.01D, where D is the effective diameter of the rotor, the diameter of the cylindrical outline in which the tips of the blades rotate. The radius R can vary between 0.04D and infinity, the side plate portion 26 when R is infinite, being, of course straight in section. The distance $h$ can vary between 0.015D and 0.03D. The distance L can vary between 0.03D and 0.055D. When the portion 26 is straight in section, there is no radius R, but since its inner end is joined tangentially with the outer end of the inner curved portion 25, and its outer end ends at the distance $h$ from the line 29, and at the distance L from the straight side plate portion 22, it can easily be located. The location of the outer end of the side plate portion 25 is not known, but only one straight, in section, portion 26 can have its inner end joined tangentially with the portion 25 and its outer end at the distances $h$ and L.

Innermost curved side plate portions having the radius $r$ have previously been used but their outer ends have joined with outer side plate portions, straight in section, and parallel to the axes of the rotors so that the inlet passages have not diverged except around the small inner portions having the radius $r$. Inlet passages so formed cannot turn the air properly for completely loading the blades, and are used only where cost instead of efficiency is the primary consideration.

What is claimed, is:

1. A centrifugal fan rotor comprising a straight, radially extending back plate, a side plate having a straight, radially extending outer portion spaced outwardly from said back plate, and a plurality of fan blades having straight inner sides in contact with said back plate and having straight outer sides in contact along their entire lengths with said straight portion of said side plate, said blades having noses equally spaced from the axis of said rotor, said rotor having a diverging, axial inlet passage, said side plate having a curved portion extending around said passage and merging with said straight side plate portion at the same distance from said axis as said noses are from said axis, the inner portion of said curved portion having in side section, a relatively small arc and a relatively small radius, and the outer portion of said curved portion having in said side section, a relatively large arc and a relatively large radius, a line extending through the outer end of said curved portion normal to said axis being not less than 0.03D and not more than 0.055D along a line parallel to said axis from said straight portion of said side plate, said outer end of said curved portion being at a distance along said line of not less than 0.015D and not more than 0.03D from a line extending through the center of curature of said inner portion of said curved portion parallel to said axis, where D is the effective diameter of said rotor.

2. A centrifugal fan rotor as claimed in claim 1 in which the radius of said inner portion of said curved portion is approximately 0.01D, and in which the radius of said outer portion of said curved portion is not less than 0.04D.

3. A centrifugal fan rotor as claimed in claim 2 in which said side plate has around said passage a portion straight in said side section, parallel to said axis and at the same distance from said axis as said outer end of said outer portion of said curved portion is from said axis, and with its inner end merging with said outer end of said outer portion of said curved portion.

References Cited by the Examiner

UNITED STATES PATENTS

| 2,111,136 | 3/1938 | Bauer | 230—134.45 |
| 2,413,225 | 12/1946 | Griffith | 230—127 |

FOREIGN PATENTS

| 1,299,702 | 7/1962 | France. |
| 1,004,764 | 2/1956 | Germany. |
| 710,391 | 6/1954 | Great Britain. |

MARK NEWMAN, *Primary Examiner.*

HENRY F. RADUAZO, *Examiner.*